(12) United States Patent  
Fan et al.

(10) Patent No.: US 8,768,948 B2  
(45) Date of Patent: Jul. 1, 2014

(54) METHODS, SYSTEMS, AND COMPUTER PROGRAM PRODUCTS FOR PROVIDING AN INTEGRATED KNOWLEDGE MANAGEMENT SYSTEM

(75) Inventors: James W. Fan, San Ramon, CA (US); Jennifer K. Lam, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 778 days.

(21) Appl. No.: 12/627,628

(22) Filed: Nov. 30, 2009

(65) Prior Publication Data

US 2011/0131227 A1    Jun. 2, 2011

(51) Int. Cl.
*G06F 7/00* (2006.01)
*G06F 17/30* (2006.01)

(52) U.S. Cl.
USPC .......................................... 707/760; 707/802

(58) Field of Classification Search
USPC ................................. 707/760, 802
See application file for complete search history.

(56) References Cited

U.S. PATENT DOCUMENTS

| 7,225,177 B2 * | 5/2007 | Wu et al. .......................... 706/48 |
| 7,966,319 B2 * | 6/2011 | Faus et al. ..................... 707/723 |
| 2008/0262901 A1 * | 10/2008 | Banga et al. .................... 705/10 |

* cited by examiner

*Primary Examiner* — Kuen Lu
(74) *Attorney, Agent, or Firm* — Cantor Colburn LLP

(57) ABSTRACT

Methods, systems, and computer program products for providing an integrated knowledge management system are provided. A method includes configuring access interfaces between a knowledge management system and each of respective external domains serviced by a service provider entity. The knowledge management system includes a knowledge engine and a source of information that is local to the knowledge management system. The method further includes configuring access interfaces between the knowledge management system and each of respective access channels serviced by the service provider entity. The method further includes receiving a request for information via a knowledge engine from at least one of the access interfaces, searching one or more knowledge bases for the information and providing a response to the request for information based upon the searching. The access interfaces, knowledge engine, and knowledge management system collectively portion at least a portion of the integrated knowledge management system.

17 Claims, 5 Drawing Sheets

METHODS, SYSTEMS, AND COMPUTER PROGRAM PRODUCTS FOR PROVIDING AN INTEGRATED KNOWLEDGE MANAGEMENT SYSTEM

BACKGROUND OF THE INVENTION

The present disclosure relates generally to knowledge management and, in particular, to methods, systems, and computer program products for implementing an integrated knowledge management system.

In recent years, many traditional telecommunication companies have transformed themselves from network transport providers to rich information and entertainment service providers. To facilitate this transition, these companies are building new network infrastructures. However, to fully support rich information and entertainment services, system infrastructures that support these diversified services (e.g., wireless and wireline), as well as applications (e.g., IP telephone, data, and IP video applications) need to be established and/or enhanced.

One of such supporting infrastructures is in the knowledge management domain of the service provider's customer care organization. For example, in the telecommunications industry, a customer care organization provides assistance to its customers and/or prospective customers, such as provisioning telecommunications services, providing information concerning service offerings, product offerings, account information, and technical support, to name a few.

Knowledge management has been defined as a process for gathering and organizing information for subsequent use. An efficient way to supply relevant information to a knowledge consumer may enable the service provider to reduce overall support costs. Some service providers utilize industry standard models in developing business and operations support systems (BSS/OSS), e.g., enhanced Telecommunications Operations Map (eTOM) and Telecommunications Management Network (TMN). However, what continues to be lacking from these models is a cohesive knowledge management reference framework that addresses the collective needs of knowledge consumers across varying platforms by supporting knowledge consumption for varying access channels utilized by end consumers, as well as support agents and field technicians of the service provider.

Using telecommunications services as an example, knowledge consumption needs are typically segmented according to business organizations (e.g., wireline services versus wireless services). Requirements for implementing an end-to-end knowledge management system are oftentimes developed by a respective business owner that does not leverage existing knowledge bases and is known to employ specific login restrictions to limit other business organizations in consuming the domain knowledge. For example, in the wireline group, multiple knowledge management systems may be developed to support self service channels and assisted care channels, while in the wireless group a different set of knowledge management systems may be implemented to support these corresponding channels.

Furthermore, some service providers implement different knowledge management systems based on product lines. For example, in some instances when a new product organization is established, system designers may not have a clear roadmap to follow and thus may end up developing duplicate sets of information into a new knowledge management system. Many service providers today are known to use a traditional content creation environment that utilizes dedicated Methods and Procedures (M&P) writers to create content in a formal process. Informal content, such as customer relationship management (CRM) notes, Web 2.0 blogs, wilds, and communities are typically ignored. Additionally, there is no easy way to integrate diagnostic, testing and CRM systems with the knowledge management systems. Thus, it becomes difficult to present relevant content to the users in the right context.

What is needed, therefore, is a way to provide a common, shared knowledge management infrastructure accessible via varying communications channels to a knowledge consumption base.

BRIEF SUMMARY OF THE INVENTION

Exemplary embodiments of the invention include methods, systems, and computer program products for implementing a knowledge management system. A method includes configuring access interfaces between a knowledge management system of a service provider entity and each of respective external domains serviced by the service provider entity. The knowledge management system includes a knowledge engine and a source of information that is local to the knowledge management system. The method further includes configuring access interfaces between the knowledge management system and each of respective access channels serviced by the service provider entity. The method further includes receiving a request for information via a knowledge engine from at least one of the access interfaces, searching one or more knowledge bases for the information and providing a response to the request for information based upon the searching. The access interfaces, knowledge engine, and knowledge management system collectively portion at least a portion of the integrated knowledge management system Other systems, methods, and computer program products according to embodiments will be or become apparent to one with skill in the art upon review of the following drawings and detailed description. It is intended that all such additional systems, methods, and computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An integrated knowledge management system in support of a customer care domain of a product/service provider is described in accordance with exemplary embodiments. The integrated knowledge management system provides a knowledge management reference framework to support information consumption in response to requests for information originating from a variety of access channels (e.g., home portals, registration portals, interactive voice response (IVR) portals, assisted care portals, and technicians operating in remote locations, to name a few). In an exemplary embodiment, the knowledge management system integrates self-help and agent help together by sharing a common knowledge management infrastructure and key information/content.

In an exemplary embodiment, the integrated knowledge management system is implemented by a telecommunications service provider and supports complex services, such as voice, data, and video services, as well as related applications. In addition, the integrated knowledge management system provides cohesive support to address the knowledge needs of both end users (e.g., consumers of the services) and agents of the service provider.

Figure 1:
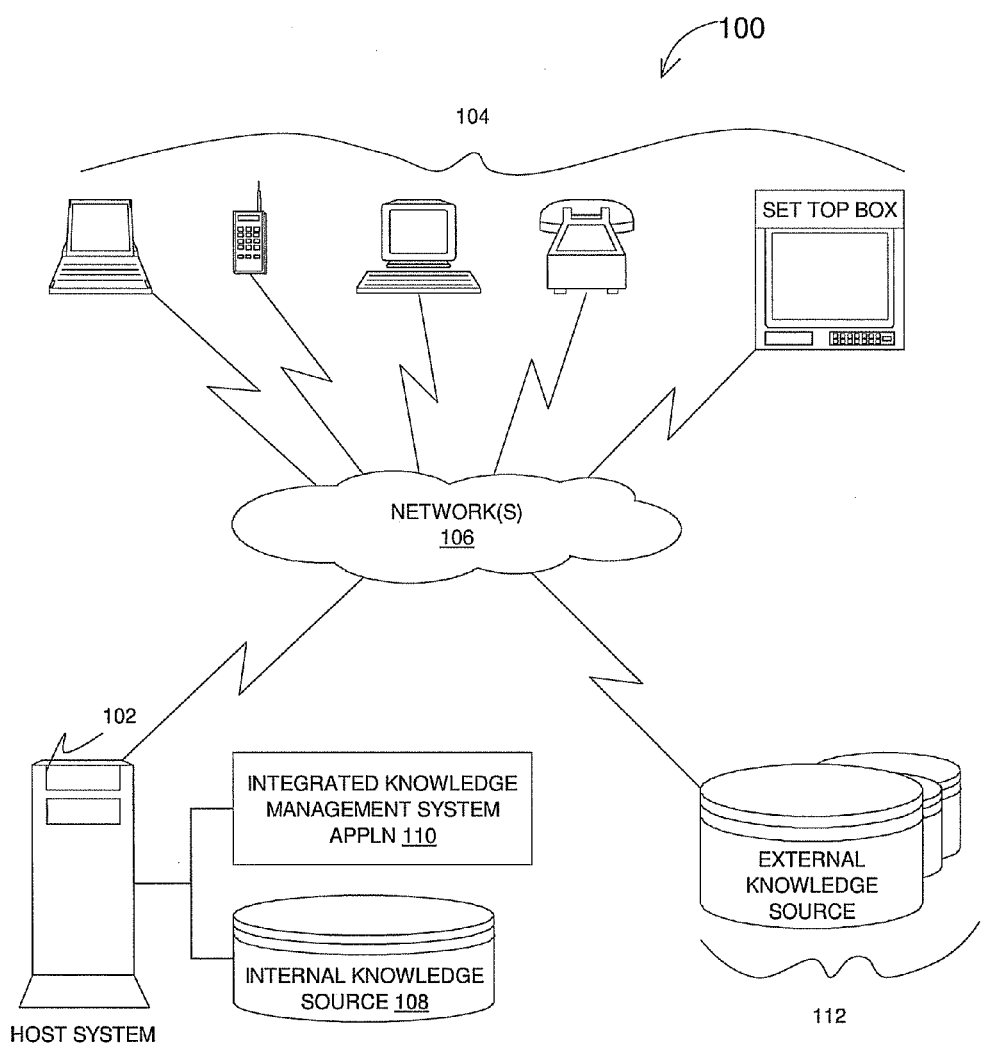
FIG. 1 is a block diagram depicting a system upon which an integrated knowledge management system may be implemented in exemplary embodiments.

Turning now to FIG. 1, an exemplary system 100 for implementing the integrated knowledge management system will now be described. The system 100 of FIG. 1 includes a host system 102 in communication with user systems 104 and one or more external knowledge sources 112 over one or more network(s) 106. In an exemplary embodiment, the host system 102 represents a telecommunications service provider that provides network transport and communications services to its customer base.

Host system 102 may be implemented using one or more servers operating in response to a computer program stored in a storage medium accessible by the server(s). The host system 102 may operate as a network server (e.g., a web server) to communicate with the user systems 104 and external knowledge sources 112. The host system 102 handles sending and receiving information to and from the user systems 104 and external knowledge sources 112 and can perform associated tasks. The host system 102 executes one or more applications in support of the telecommunications services provided to its customers. Such applications may include, e.g., a customer care application (e.g., one of care applications 210 and/or IPTV care applications 218 shown in FIG. 2) that provides product/service information, technical support, customer account, and provisioning information and services (not shown). In an exemplary embodiment, the host system 102 also executes one or more applications for facilitating the integrated knowledge management system. These one or more applications are collectively referred to herein as an integrated knowledge management system application 110. Various supporting functions may also be implemented by the host system 102 as will be described further in FIG. 2.

In exemplary embodiments, host system 102 is in communication with a storage device 108. Storage device 108 may be implemented using memory contained in the host system 102 or it may be a separate physical or virtual or logical device. As shown in FIG. 1, the storage device 108 is in direct communication with the host system 102 (via, e.g., cabling). However, other network implementations may be utilized. For example, storage device 108 may be logically addressable as a consolidated data source across a distributed environment that includes one or more networks 108. Information stored in the storage device 108 may be retrieved and manipulated via the host system 102. Storage device 108 is referred to herein as an internal knowledge source and stores a care knowledge base, as described further herein. Internal knowledge source is also referred to herein as "local information source." While the knowledge from the information source need not be physically local to the host system 102, it will be understood that "local information source" refers to information sources that are either proprietary systems or are otherwise non-public sources of information.

As indicated above, the host system 102 is also in communication with external knowledge sources 112. The external knowledge sources 112 are also referred to herein as "non-local information sources" to clearly differentiate from "internal," or "local" information sources. These external knowledge sources 112 may include independent sources of information stored in separately located data repositories that are accessed by the integrated knowledge management system to enhance the knowledge management base serviced by the integrated knowledge management system. Examples of external sources of knowledge are described further herein. External knowledge sources 112 may be may be implemented using memory contained in physical or virtual or logical devices that are distinct from the storage device 108. For example, external knowledge sources 112 may each be logically addressable as a consolidated data source across a distributed environment that includes one or more networks 106. Information stored in the external knowledge sources 112 may be retrieved and manipulated via the host system 102.

User systems 104 are operated by users at one or more geographic locations who may be agents of the service provider of host system 102 (administrative entities, customer service representatives, information technology specialists, and field technicians, to name a few). User systems 104 may also be operated by users who are customers or prospective customers of the service provider of host system 102. Operators of user systems 104 request and receive information provided via the integrated knowledge management system. In exemplary embodiments, the user systems 104 access the integrated knowledge management system via various types of access channels that include, e.g., portals configured for particular entities, services, products, or communications means. These access channels are described further herein.

As shown in FIG. 1, non-limiting examples of the types of user systems 104 that may receive services via the integrated knowledge management system include a wireless/wireline laptop computer, a mobile telephone, a general-purpose desktop computer, a POTs-enabled telephone, and an IP-enabled television and set top box.

One or more of the user systems 104 may include a computer processor and an interactive network component for communicating with the host system 102. In addition, one or more of the user systems 104 may include memory for storing at least a portion of knowledge bases offered by the integrated knowledge management system. While only five user systems 104 are shown in the system 100 of FIG. 1, it will be understood that many user systems may be implemented in order to realize the advantages of the integrated knowledge management system.

Network(s) 106 may include any type of known networks including, but not limited to, a wide area network (WAN), a local area network (LAN), a global network (e.g. Internet), a virtual private network (VPN), and an intranet. The network(s) 106 may be implemented using wireless networks (WiFi, satellite, cellular, etc.) or any kind of physical network implementation known in the art. A user system 104 may be coupled to the host system 102 through multiple networks (e.g., intranet and Internet) so that not all user systems 104 are coupled to the host system 102 through the same network.

Figure 2:
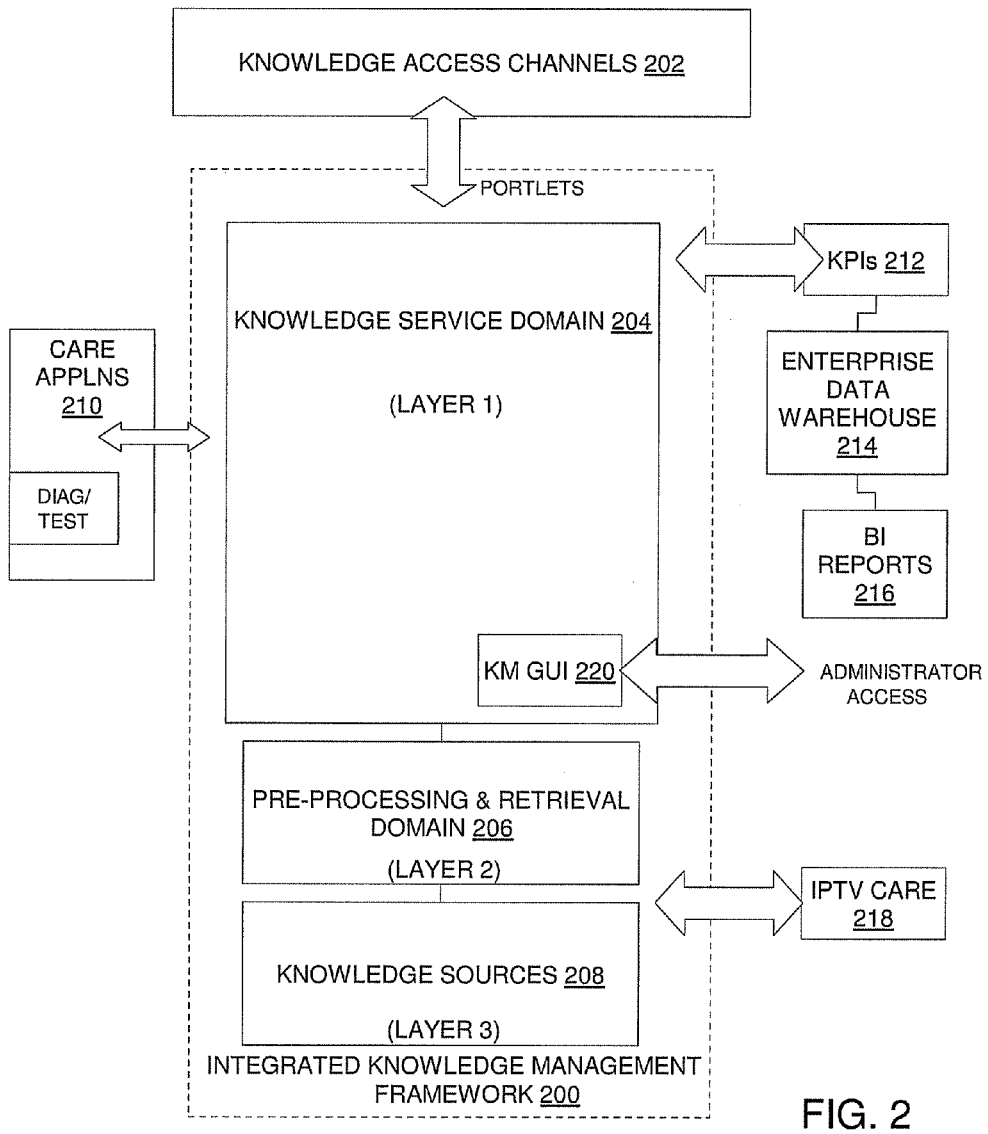
FIG. 2 is a diagram depicting an integrated knowledge management system architecture in exemplary embodiments.
Figure 3:
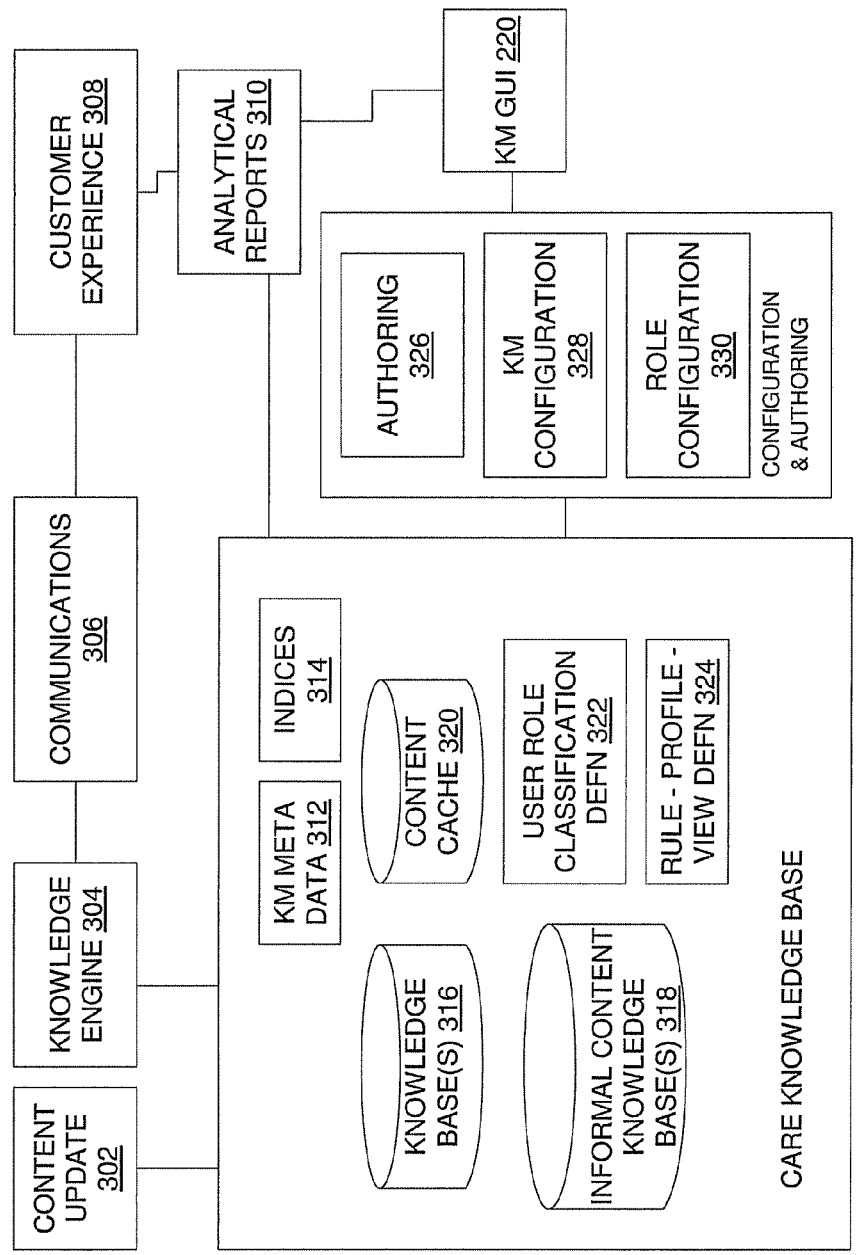
FIG. 3 is a diagram of a detailed portion of the integrated knowledge management system of FIG. 2 in exemplary embodiments.
Figure 4:
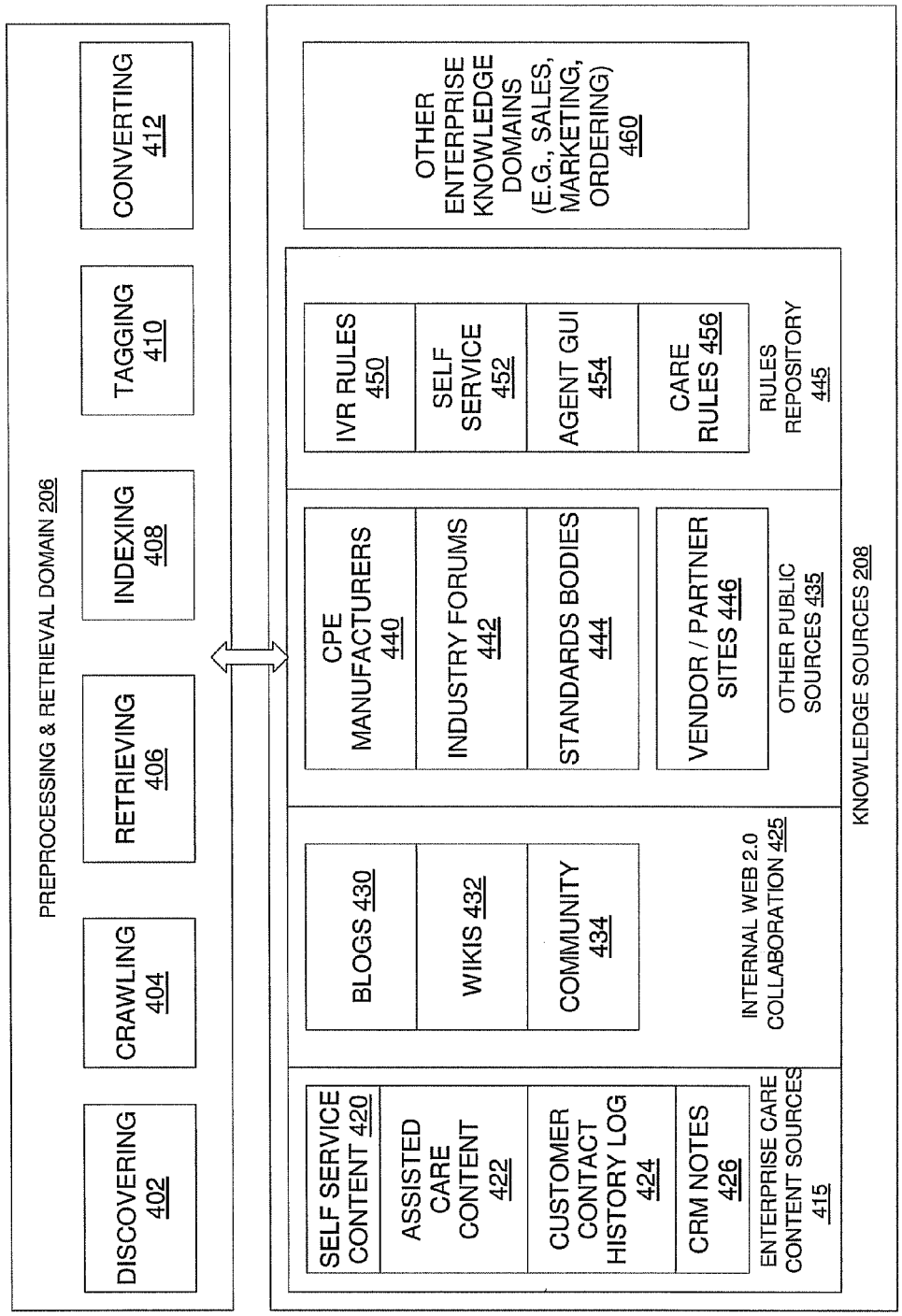
FIG. 4 is a diagram of another detailed portion of the integrated knowledge management system of FIG. 2 in exemplary embodiments.

FIG. 2 depicts a block diagram of the integrated knowledge management system infrastructure with supporting functions and components. FIG. 3 depicts a detailed portion of the integrated knowledge management system infrastructure of FIG. 2. FIG. 4 depicts another detailed portion of the integrated knowledge management system infrastructure of FIG. 2. Turning now to FIGS. 2-4, the integrated knowledge management system infrastructure will now be described in accordance with exemplary embodiments. In an exemplary embodiment, the integrated knowledge management system includes three horizontal layers, and the three layers are configured to communicate amongst one another via one or more Web Services application programming interfaces (APIs). In an exemplary embodiment, the integrated knowledge management system is configured to provide APIs/portlets for enabling services to external domains (e.g., portals for knowledge access channels 202, data warehouses 214, care applications 210, IPTV care applications 218, etc. These APIs/portlets are also referred to herein as "access interfaces." In cooperation with the three horizontal layers, the integrated knowledge management system framework includes knowledge authoring, workflow and configuration supporting functions, as well as internal knowledge databases.

In an exemplary embodiment, a first of the three layers is referred to herein as a knowledge service domain 204. The knowledge service domain 204 supports an intelligent search engine and a content re-presentation engine, collectively referred to herein as knowledge engine 304. The intelligent search engine provides the access interfaces to support multiple access channels (e.g., knowledge access channels 202) and provides federated search capabilities to retrieve information from multiple content sources (in lieu of requiring a distinct login procedure to each individual knowledge management system). The intelligent search engine may include a processor to support application-to-application searches for knowledge management searches on behalf of care applications 210. For example, when a user types keywords in a search box provided by the API, the intelligent search engine provides suggested categories for the user to select. In addition, the intelligent search engine may provide auto-search capability (e.g., automatically searching for answers before the user finishes typing the search request). Further, the intelligent search engine may support 'concept' or 'intent' based search capability to provide the requestor the most relevant answers.

The content re-presentation engine of the knowledge service domain 204 provides flexible content re-presentation to the information requestor (e.g., a request for a different view, different language, adaptive formats based on the user device type—i.e., cellular telephone, personal computer, POTS-enabled telephone, personal digital assistant, etc.—and/or the requestor's role classification).

The second of the three layers is referred to herein as a pre-processing and retrieval domain 206. The second layer includes various modules including a discovering module 402, a crawling module 404, a retrieving module 406, an indexing module 408, a tagging module 410, and a converting module 412. The discovering module 402 discovers new knowledge from other knowledge sources (i.e., checking indices of other data sources or asking other data sources to notify the discovery module of new knowledge). The discovering domain communicates with a centralized data store which stores, e.g., customer repair records, such as trouble cases, test results, trouble histories, etc. The central data store may be housed in the care knowledge base shown in FIG. 3.

The crawling module 404 crawls external knowledge management databases to learn of new knowledge. The retrieving module 406 retrieves content from various external sources (e.g., knowledge sources 208). The indexing module 408 indexes the contents of the internal knowledge bases (e.g., care knowledge base) and the external knowledge bases (e.g., knowledge sources 208). The tagging module 410 tags the contents (e.g., information derived from either internal or external sources). The converting module 412 associates the external knowledge with the integrated knowledge management system, e.g., by converting the format of the external knowledge to one that is consistent with the internal knowledge store (i.e., care knowledge base). When the intelligent search engine (i.e., knowledge engine 304) performs a federated search, the converting module 412 may convert the search results to the format understood by the integrated knowledge management system platform. In addition, the converting module 412 may later convert the results to a presentation format upon a request by the knowledge engine 304.

In an exemplary embodiment, the third layer of the integrated knowledge management system includes external content sources and one IPTV content source 208. As shown in FIG. 3, by way of non-limiting example, the four external content sources include enterprise care content sources 415, internal Web 2.0 collaboration sources 425, other public sources 435, rules repository 445, and other enterprise knowledge management domains 460. The enterprise care content sources 415 may include existing knowledge management content management system (CMS) content, which in turn may include customer relationship management (CRM) notes 426, self-service information 420, assisted care help content and M&Ps 422, customer contact history logs 424, as well as other similar types of information.

The internal Web 2.0 collaboration sources 425 may include blogs 430, forums, network communities 434, wikis 432, or other collaborative content sources. Other public sources 435 include knowledge sources outside of the service provider's business domain (e.g., vendor web sites 446, customer premise equipment (CPE) manufacturers' web sites 440, standards body web sites 444, industry forums 442, public collaborative content sources, etc.). The rules repository 445 may include rules determined as critical knowledge sources (e.g., care application rule-set 456—e.g., diagnostic/testing rules, IVR rule-set, self-service rule-set 452, and assisted care rule-set 454). All rules may have an English language equivalent content mapping, which provides tier 1 and tier 2 agent educational sources, as well as helps trouble shoot faulty rules that are known to cause mishandling of customer reported issues.

Other enterprise knowledge domains 460 may be integrated with the integrated knowledge management system for enabling access to content from sales, marketing, ordering, and billing domains, to name a few.

When a user of user devices 104 (e.g., IPTV) browses through care content (e.g., care infomercials), this content may be considered part of the knowledge management domain. Many of these IPTV care video clip contents may be viewed by web channel as well. Thus, the integrated knowledge management system provides integration between IPTV care content and the integrated knowledge management system platform.

As indicated above, the knowledge service domain 204 supports an intelligent search engine and a content re-presentation engine (collectively, knowledge engine 304). Various supporting functions may be enabled via the knowledge service domain 204. As shown in FIG. 3, e.g., configuration & authoring, auto-reply (referred to herein as "communications") 306, analytical reports 310, customer experience tracking 308, and a knowledge management graphical user interface (GUI) 220.

Configuration and authoring capabilities are configured for internal knowledge management repositories (e.g., care knowledge base). The configuration and authoring also enables knowledge management administrators (e.g., through one of user systems 104) to create views/profiles/rules 324 for a business organization via the knowledge management GUI 220. Further, the configuration and authorizing also enables an administrator to create user role classifications 322. These classifications are enabled through logic provided via authoring 326, KM configuration 328, and role configuration 330 functions of the configuration and authoring component. User role classifications 322 may differentiate among the types of users who access the integrated knowledge management system. For example, a user who is technologically educated in the products/services offered by the service provider (e.g., a field representative) may be classified in a first role, whereas another user who is a customer/end user of the products/services offered by the service provider may be classified in a second role. By differentiating system users by classification, the integrated knowledge management system, via the configuration and authoring function, may provide customized information to requests for information based upon a user's knowledge/skills. A view refers to the format in which information responsive to user requests are provided (e.g., a view for an IPTV end user may be configured to include familiar control options common to a remote control-operated system).

The auto-reply function 306 provides the ability to intercept messages (e.g., emails) from user systems 104 and present choices (e.g., the type of information the user prefers to allow the knowledge management to retrieve before the user sends the message). The auto-reply function 306 further acts as a virtual agent to conduct conversations after receiving a message (e.g., email or SMS queries). This function involves automatically researching the query text and sending the answer back to the requestor.

The analytical reporting function 310 keeps track of comments, ratings of content, and generates reports to be used by content authors or administrators to improve the content itself or the presentation format of the content. The analytical reporting function also reads user comments/ratings, and applies tags to this information (e.g., via the tagging module 410) for analysis (e.g., determining whether the comments/ratings are useful). The filtered comments/ratings may be stored in an informal data store (e.g., informal content knowledge base 318).

The customer experience tracking function 308 may be used to track all customer experience indicators relating to knowledge management content and its supporting functions. Some of the data may be fed to the analytical reporting module 310 to generate internal knowledge management reports. Some of the data may be fed to an external key performance indicator (KPI) system 212 to generate business intelligence summary reports 216.

The knowledge management GUI 220 provides an internal portal to support content authorizing and system administration and configuration functions.

In addition to the above-referenced supporting functions of the knowledge service domain 204, the care knowledge base is also configured to support the knowledge service domain. The care knowledge base includes two components: knowledge repositories 316 and supporting repositories 320. Knowledge repositories 316 support local, regional, customized, and temporary databases. The knowledge repositories 316 further provide support to create a temporary, regionalized, special-purposed knowledge base (e.g., a temporary center to support a disaster region, an Olympic event in a local city, etc.). The knowledge repositories 316 also support the use of mini knowledge bases to prototype new businesses and user requirements. The knowledge repositories 316 may also support informal content knowledge base 318, which houses informal content (e.g., emails, notes, quality information, blog/forum information, etc.).

Supporting repositories include content cache repositories 320, knowledge management meta data 312, index data store 314, tagging, user role classification definition data 322, and rule/profile/view definition data 324.

Content cache repositories 320 store the most frequently used content, in addition to static content that is determined to improve system performance. Meta data 312 may be created by knowledge management systems or may be defined by authors (e.g., including titles, abstracts, location of data, applications, versions, media types, information sensitivity, etc). Metadata 312 may be searched via the search function of the knowledge engine 304 before it searches for content.

The index data store 314 may house the location of content, categories of content, and/or similar characteristics. Tagging store (not shown) may index entire content and/or index segments of the content. The user role classification definitions data 322 may be stored by product, level of competency, or other criteria defined via the knowledge management GUI. As indicated above, the Rule/Profile/View definitions data 324 may be used by an administrator to create distinct views based on the needs of different organizations or portal requests. An administrator may create profiles for a group, an organization, a category of document, etc. (e.g., one of such rules may be to exclude all DSL modem type information for a particular product from being indexed due to retirement of the modem).

In an exemplary embodiment, the integrated knowledge management system provides external interface domains for enabling a single knowledge management consumption point for all channels and applications in order to provide internally-owned or externally-owned content to requesting entities.

As shown in FIG. 2, external domains include access portals 202, care applications 210/218, and KPI applications 212. The access portals 202 allow external channels to consume information stored either internally or externally to the knowledge management repository. Non-limiting examples of access portals include a home knowledge management portal, a self-care portal, an IVR portal, a registration portal, messaging response system portal, and a single agent portal (not shown).

The home knowledge management portal provides a home knowledge management repository locally resident with the customer premise equipment (CPE). The home knowledge management portal may receive a periodic feed including a subset of knowledge management data that allows the customer to access the information even when the CPE is offline. The self-care portal is configured to enable access to knowledge through a help feature. The help feature may provide knowledge to a user through a guided flow in order to solve problems or reconfigure corrupted profiles (or reset a password), etc. Additionally, when a customer is using an IPTV channel (e.g., an emulated Web channel) to access care knowledge management information, this information may be adjusted to the format of the IPTV channel (e.g., remote control click functions) and then supplied to the customer.

The IVR portal may provide guided flow access to knowledge (e.g., to resolve issues or reset a password). The knowledge may be indirectly accessed to obtain knowledge information (e.g., knowledge may be requested via the IVR channel but routed through a different access channel, such as email).

The registration portal may be utilized when a user initiates a registration process and encounters an error condition. The error handling processes configured for the error condition interface with the integrated knowledge management system to determine resolutions for the condition.

Messaging response systems may include a knowledge management auto-reply module to intercept a query message from an email server, SMS server, etc., and provide a relevant answer (or send links or documents) back to the requestor via the query processor module.

The single agent portal provides access for assisted care agents using a 'search' function that directly or indirectly invokes the integrated knowledge management system knowledge base via a care application's user interface (e.g., CRM, diagnostic, testing systems, etc.). The assisted care agents are not required to logon to any backend knowledge management system or even to know the existence of any external knowledge management systems.

The external interface domain for the customer care applications 210 supports a pre-defined format to craft a trouble care flow. The knowledge management output may become an input to a care system to be converted into a step-by-step flow for providing guided help. When a care application 210 has partially completed execution of particular trouble shooting functions, and needs assistance to continue operations, it may access knowledge management resources via the external interface domain for this assistance in real time.

The external interface domain for the KPI applications 212 provide key performance raw data or pre-generated reports to the external KPI applications 212, which integrate knowledge management KPIs with other KPI data stored in a data warehouse (e.g., 214) to generate enterprise-wide analytical reports. Optionally, the integrated knowledge management system may retrieve business intelligence reports 216 on behalf of a requestor in the care domain.

Figure 5:
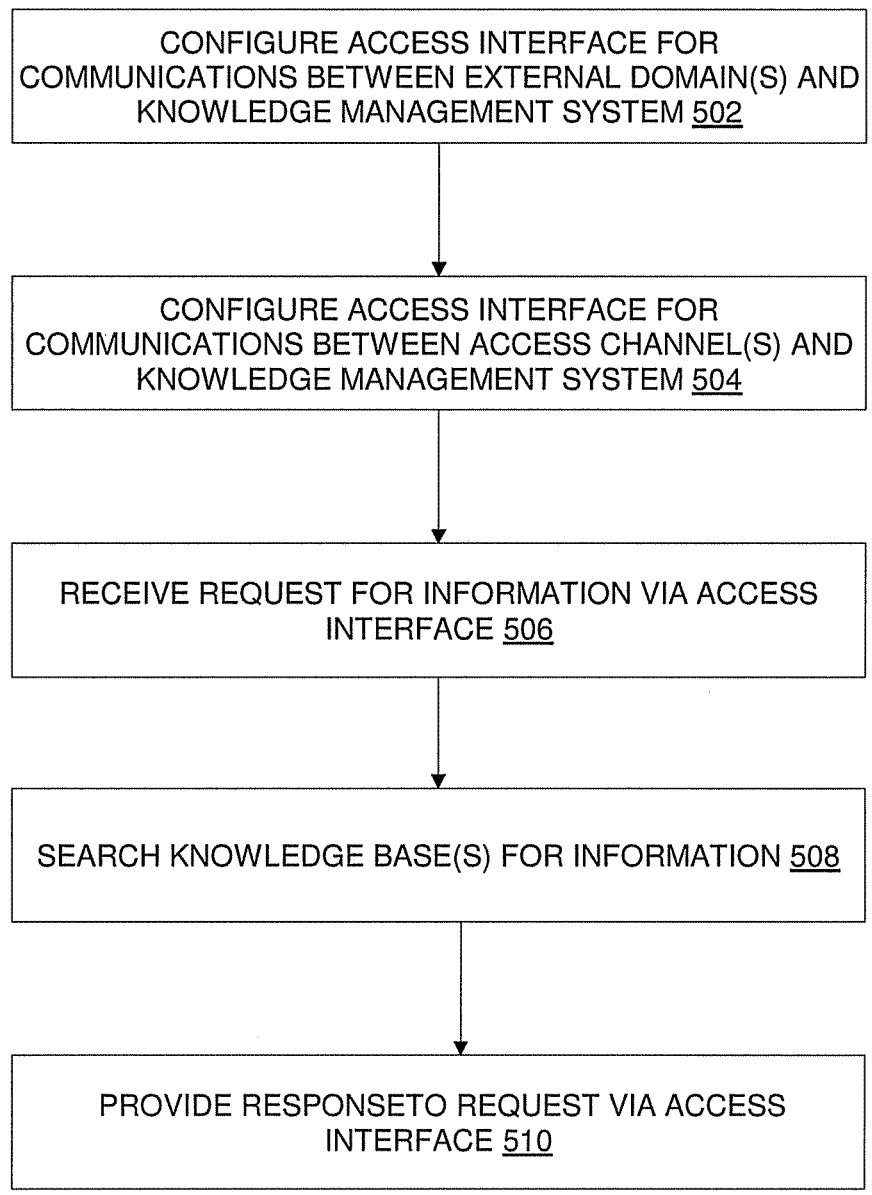
FIG. 5 is a flow diagram describing a process for implementing the integrated knowledge management system in exemplary embodiments.

Turning now to FIG. 5, a process for implementing the integrated knowledge management system will now be described. At step 502, an access interface is configured for communications between each of corresponding one or more external domains and a knowledge management system via the integrated knowledge management application 110. At step 504, an access interface is configured for communications between corresponding one or more access channels and the knowledge management system via the integrated knowledge management application 110. In response to a request for information via the knowledge engine 304 from at least one of the access interfaces at step 506, the knowledge engine 304 searches one or more knowledge bases (e.g., care knowledge base, knowledge sources 208) at step 508, and provides a response to the request for information as a result of the search at step 510. As indicated above, the integrated knowledge management system utilizes components of the domains 204, 206, and 208 to process information from the request, search the appropriate content sources, retrieve relevant responsive information, and re-format the responsive information according to criteria including the capabilities/characteristics of the requesting source, as well as authoring/configuration/classifications provided by the system. A search query relating to the request may first be created and implemented for internal knowledge sources, and if the search results are not satisfactory or otherwise not fully responsive to the request, a second search query may be created and implemented for external knowledge sources, thereby expanding the knowledge base.

As described above, by providing the integrated knowledge management system infrastructure, user devices that span varying types of access channels, as well as relevant business organizations, may benefit from a cohesive information source, thereby providing improved customer experiences upon encountering any issues with products/services, operational efficiencies, reducing operational costs, and increasing customer retention rates.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing an integrated knowledge management system, comprising:
    configuring access interfaces between a knowledge management system of a service provider entity and each of respective external domains serviced by the service provider entity, the knowledge management system comprising a knowledge engine and a local source of information that is local to the knowledge management system;
    configuring access interfaces between the knowledge management system and each of respective access channels serviced by the service provider entity;
    receiving a request for information via the knowledge engine from one of the access interfaces;
    associating a classification with a role assigned to a requestor of the request for information, the role associated with a list of roles that include a customer of the service provider entity, a service technician employed by the service provider entity, and a sales employee of the service provider entity;

searching a knowledge base for the information, the knowledge base including the local source of information;

tailoring a response based on the classification associated with the role, and providing the response to the request for information based upon the searching.

2. The method of claim 1, wherein the external domains include non-local sources of information, the method further comprising:

upon determining that searching the local source of information is not responsive to the request for information:

reconfiguring the request for information to produce a search having a format compatible with one of the non-local sources of information; and searching the non-local sources of information using a reconfigured request resulting from the reconfiguring the request.

3. The method of claim 1, wherein the providing a response to the request for information includes:

determining a presentation view in which to reformat the response based upon a type of access channel initiating the request for information; and reformatting the response to coincide with the access channel identified for the request for information.

4. The method of claim 1, wherein the external domains include an Internet Protocol-enabled television application, the method further comprising:

reformatting the response to coincide with the Internet Protocol-enabled television application before sending the response.

5. The method of claim 1, wherein one of the access channels is configured for an end user device, the method further comprising:

transmitting a portion of the knowledge management system to the end user device.

6. The method of claim 1, wherein configuration and authoring capabilities are configured into the knowledge management system, the method further comprising:

tailoring the response based upon a profile associated with a type of access channel from which the request for information was initiated.

7. The method of claim 1, further comprising:

creating a temporary knowledge base including content that supports a transient event;

wherein the searching a knowledge base for the information includes searching the temporary knowledge base.

8. A system for providing an integrated knowledge management system, comprising:

a host system computer; and an application executing on the host system computer, the application configured to implement a method, the method comprising:

configuring access interfaces between a knowledge management system of a service provider entity and each of respective external domains serviced by the service provider entity, the knowledge management system comprising a knowledge engine and a local source of information that is local to the knowledge management system, the knowledge engine forming a portion of the application;

configuring access interfaces between the knowledge management system and each of respective access channels serviced by the service provider entity;

receiving a request for information via the knowledge engine from one of the access interfaces;

associating a classification with a role assigned to a requestor of the request for information, the role associated with a list of roles that include a customer of the service provider entity, a service technician employed by the service provider entity, and a sales employee of the service provider entity;

searching a knowledge base for the information, the knowledge base including the local source of information;

tailoring a response based on the classification associated with the role, and providing the response to the request for information based upon the searching.

9. The system of claim 8, wherein the external domains include non-local sources of information, the method further comprising:

upon determining that searching the local source of information is not responsive to the request for information:

reconfiguring the request for information to produce a search having a format compatible with one of the non-local sources of information; and searching the non-local sources of information using a reconfigured request resulting from the reconfiguring the request.

10. The system of claim 8, wherein the providing a response to the request for information includes:

determining a presentation view in which to reformat the response based upon a type of access channel initiating the request for information; and reformatting the response to coincide with the access channel identified for the request for information.

11. The system of claim 8, wherein the external domains include an Internet Protocol-enabled television application, the method further comprising:

reformatting the response to coincide with the Internet Protocol-enabled television application before sending the response.

12. The system of claim 8, wherein one of the access channels is configured for an end user device, the method further comprising:

transmitting a portion of the knowledge management system to the end user device.

13. A computer program product for providing an integrated knowledge management system, the computer program product comprising a storage medium encoded with computer-readable instructions, which when executed by a computer cause the computer to implement a method, the method comprising:

configuring access interfaces between a knowledge management system of a service provider entity and each of respective external domains serviced by the service provider entity, the knowledge management system comprising a knowledge engine and a local source of information that is local to the knowledge management system;

configuring access interfaces between the knowledge management system and each of respective access channels serviced by the service provider entity;

receiving a request for information via the knowledge engine from one of the access interfaces;

associating a classification with a role assigned to a requestor of the request for information, the role associated with a list of roles that include a customer of the service provider entity, a service technician employed by the service provider entity, and a sales employee of the service provider entity;

searching a knowledge base for the information, the knowledge base including the local source of information;

tailoring a response based on the classification associated with the role, and providing the response to the request for information based upon the searching.

14. The computer program product of claim 13, wherein the external domains include non-local sources of information, the method further comprising:
upon determining that searching the local source of information is not responsive to the request for information:
reconfiguring the request for information to produce a search having a format compatible with one of the non-local sources of information; and
searching the non-local sources of information using a reconfigured request resulting from the reconfiguring the request.

15. The computer program product of claim 13, wherein the providing a response to the request for information includes:
determining a presentation view in which to reformat the response based upon a type of access channel initiating the request for information; and
reformatting the response to coincide with the access channel identified for the request for information.

16. The computer program product of claim 13, wherein the external domains include an Internet Protocol-enabled television application, the method further comprising:
reformatting the response to coincide with the Internet Protocol-enabled television application before sending the response.

17. The computer program product of claim 13, wherein one of the access channels is configured for an end user device, the method further comprising:
transmitting a portion of the knowledge management system to end user device.

* * * * *